(12) United States Patent
Hu et al.

(10) Patent No.: US 12,736,690 B2
(45) Date of Patent: Sep. 15, 2026

(54) METHOD AND APPARATUS FOR PROCESSING SCINTILLATION PULSES, AND DEVICE AND STORAGE MEDIUM

(71) Applicant: RAYSOLUTION HEALTHCARE CO., LTD, Hefei (CN)

(72) Inventors: Yun Hu, Hefei (CN); Lei Fang, Hefei (CN); Bo Zhang, Hefei (CN); Lingli Yang, Hefei (CN); Weicao Chen, Hefei (CN); Wenlue Huang, Hefei (CN)

(73) Assignee: RAYSOLUTION HEALTHCARE CO., LTD, Hefei (CN)

( * ) Notice: Subject to any disclaimer, the term of this patent is extended or adjusted under 35 U.S.C. 154(b) by 101 days.

(21) Appl. No.: 18/880,295

(22) PCT Filed: Dec. 19, 2023

(86) PCT No.: PCT/CN2023/139951
§ 371 (c)(1),
(2) Date: Dec. 31, 2024

(87) PCT Pub. No.: WO2024/140346
PCT Pub. Date: Jul. 4, 2024

(65) Prior Publication Data

US 2026/0003084 A1 Jan. 1, 2026

(30) Foreign Application Priority Data

Dec. 30, 2022 (CN) ......................... 202211731578.5

(51) Int. Cl.
*G01T 1/208* (2006.01)
*G01T 1/202* (2006.01)
*G01T 1/29* (2006.01)

(52) U.S. Cl.
CPC .............. *G01T 1/208* (2013.01); *G01T 1/202* (2013.01); *G01T 1/2985* (2013.01)

(58) Field of Classification Search
None
See application file for complete search history.

(56) References Cited

U.S. PATENT DOCUMENTS 10,768,318 B2 * 9/2020 Qiang .................... G01T 1/2985
11,733,405 B1 * 8/2023 Zhang ...................... G01T 1/172
250/363.02
2013/0087710 A1 * 4/2013 Zhang ..................... G01T 1/249
250/362

* cited by examiner

*Primary Examiner* — David J Makiya

(57) ABSTRACT

A method and apparatus for processing scintillation pulses, and a device and a storage medium. The method includes: presetting two trigger thresholds, and respectively performing multi-voltage threshold sampling on at least two scintillation pulses based on the two trigger thresholds, to acquire first sampling data; based on the first sampling data, determining one or more effective scintillation pulses from among at least two scintillation pulses; superimposing the effective scintillation pulses, to acquire a target scintillation pulse; presetting multiple sampling thresholds, and performing multi-voltage threshold sampling on the target scintillation pulse based on multiple sampling thresholds, to acquire second sampling data; based on the second sampling data, determining whether the target scintillation pulse corresponds to a real single event; and if the target scintillation pulse corresponds to a real single event, based on the first sampling data and the second sampling data, determining event information of the real single event.

25 Claims, 6 Drawing Sheets

Figure 1:
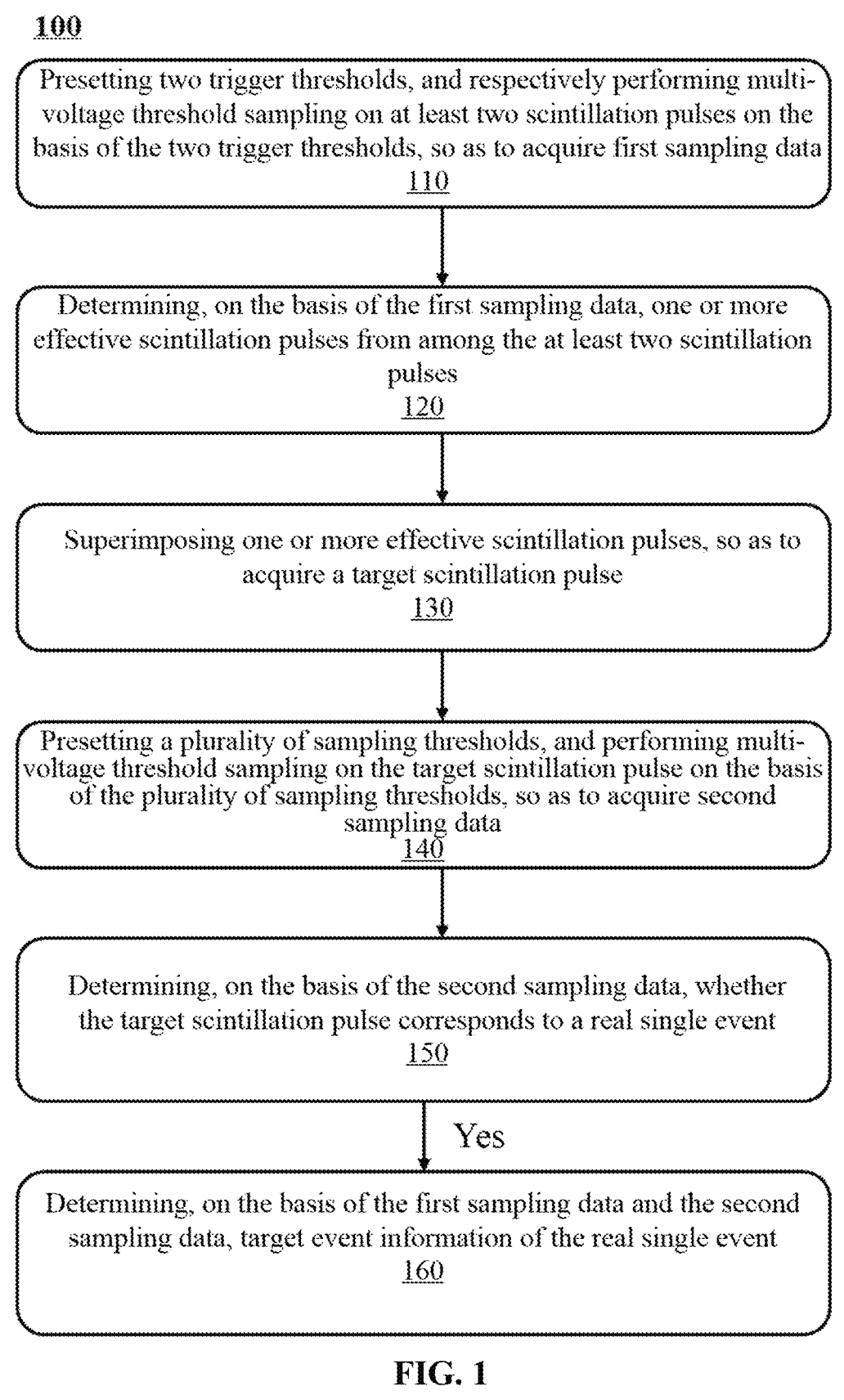

100

Presetting two trigger thresholds, and respectively performing multi-voltage threshold sampling on at least two scintillation pulses on the basis of the two trigger thresholds, so as to acquire first sampling data
110

Determining, on the basis of the first sampling data, one or more effective scintillation pulses from among the at least two scintillation pulses
120

Superimposing one or more effective scintillation pulses, so as to acquire a target scintillation pulse
130

Presetting a plurality of sampling thresholds, and performing multi-voltage threshold sampling on the target scintillation pulse on the basis of the plurality of sampling thresholds, so as to acquire second sampling data
140

Determining, on the basis of the second sampling data, whether the target scintillation pulse corresponds to a real single event
150

Yes

Determining, on the basis of the first sampling data and the second sampling data, target event information of the real single event
160

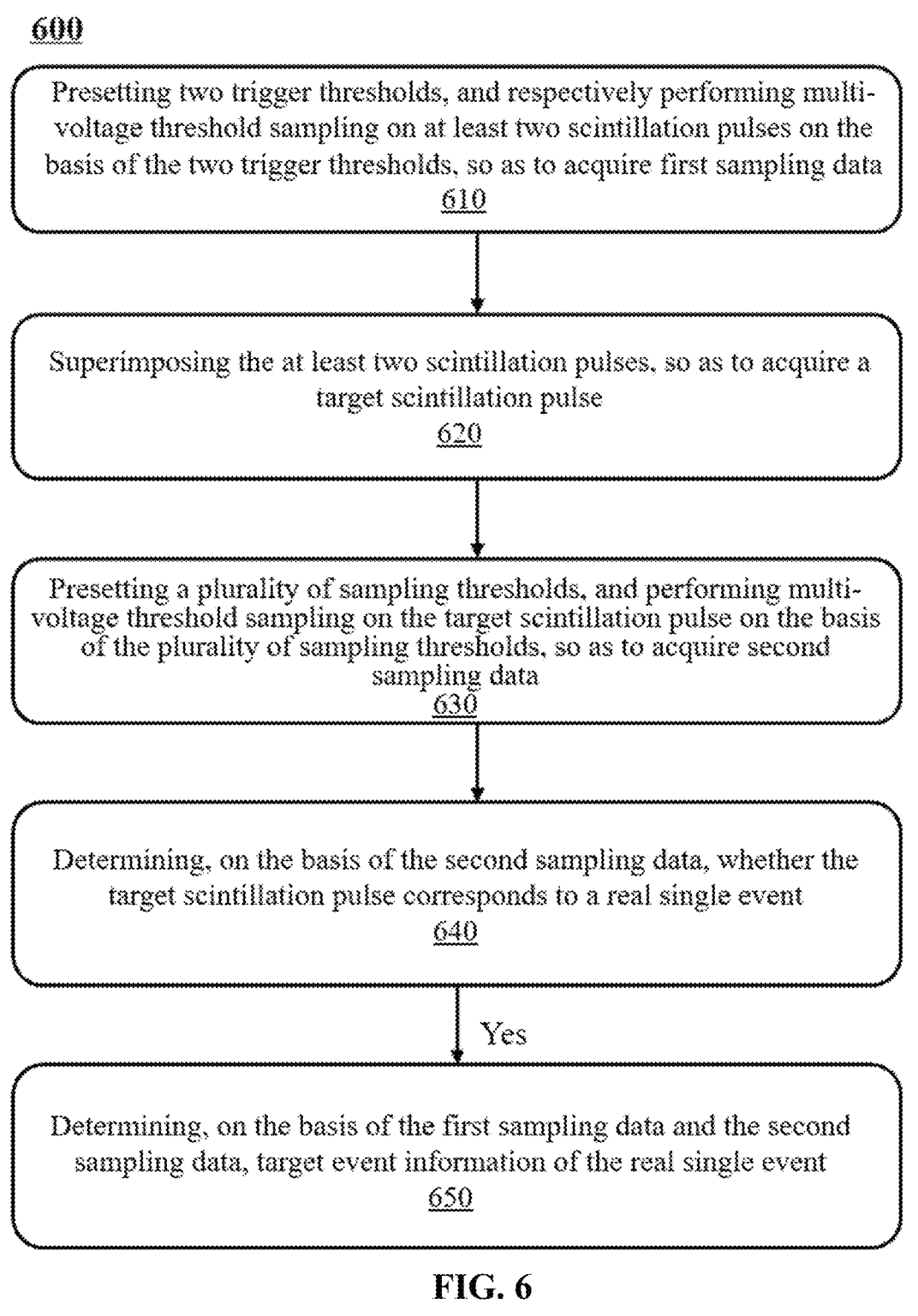

Presetting two trigger thresholds, and respectively performing multi-voltage threshold sampling on at least two scintillation pulses on the basis of the two trigger thresholds, so as to acquire first sampling data
610

Superimposing the at least two scintillation pulses, so as to acquire a target scintillation pulse
620

Presetting a plurality of sampling thresholds, and performing multi-voltage threshold sampling on the target scintillation pulse on the basis of the plurality of sampling thresholds, so as to acquire second sampling data
630

Determining, on the basis of the second sampling data, whether the target scintillation pulse corresponds to a real single event
640

Yes

Determining, on the basis of the first sampling data and the second sampling data, target event information of the real single event
650

FIG. 6

METHOD AND APPARATUS FOR PROCESSING SCINTILLATION PULSES, AND DEVICE AND STORAGE MEDIUM

CROSS-REFERENCE TO RELATED APPLICATION

The present disclosure claims the priority to the Chinese patent application with the filling No. 202211731578.5 filed with the Chinese Patent Office on Dec. 30, 2022, and entitled "METHOD AND APPARATUS FOR PROCESSING SCINTILLATION PULSES, AND DEVICE AND STORAGE MEDIUM", the contents of which are incorporated herein by reference in entirety.

TECHNICAL FIELD

The present disclosure relates to the field of data processing, and particularly, to a method, an apparatus, an electronic device, and a method and an apparatus for processing scintillation pulses, and a device and a storage medium.

BACKGROUND ART

Positron emission tomography (PET) is a widely applied nuclear medical imaging diagnostic technology in clinical practice, which provides functional information such as the metabolism of the living body by imaging the radioactive tracer injected into the living body. It plays an important role in clinical diagnosis, efficacy evaluation, basic medical research, and new drug development.

In the prior art, the digital sampling of scintillation pulses output by detectors in the PET system can be realized by multi-voltage threshold (MVT) sampling circuits. However, since gamma photons may undergo Compton scattering during their travel, the energy of the gamma photons changes, and the direction shifts, leading to an energy deposition on multiple crystal channels of the detector. This phenomenon is called inter-crystal scattering. Therefore, it is necessary to correct inter-crystal scattering events to improve the sensitivity of the system.

After scattering, gamma photons will generate one or more pulses with smaller energy. The signals collected by crystal channels are relatively small, in addition to the intrinsic signal interference, when an independent sampling solution in each channel is used, the scintillation pulses can fail to be collected or incorrect scintillation pulses can be collected (for example, interference signals) if the energies are smaller. Additionally, the MVT method has significant energy calculation deviations for small-energy pulses, leading to inaccurate restoration of event energy information.

SUMMARY

The technical problem to be solved by the embodiments of the present disclosure lies in how to achieve high-precision and high-sensitivity sampling of scintillation pulses while avoiding erroneous sampling.

To solve the above problem, the present disclosure provides a method and an apparatus for processing scintillation pulses, and a device and a storage medium.

According to the first aspect of the present disclosure, a method for processing scintillation pulses is provided. The method includes presetting two trigger thresholds, and respectively performing multi-voltage threshold sampling on at least two scintillation pulses on the basis of the two trigger thresholds, so as to acquire first sampling data; determining, on the basis of the first sampling data, one or more effective scintillation pulses from among the at least two scintillation pulses; superimposing one or more effective scintillation pulses, so as to acquire a target scintillation pulse; presetting a plurality of sampling thresholds, and performing multi-voltage threshold sampling on the target scintillation pulse on the basis of the plurality of sampling thresholds, so as to acquire second sampling data; determining, on the basis of the second sampling data, whether the target scintillation pulse corresponds to a real single event; and determining event information of the real single event based on the first sampling data and the second sampling data, when the target scintillation pulse corresponds to the real single event.

According to some embodiments of the present disclosure, the step of determining, on the basis of the first sampling data, one or more effective scintillation pulses from among the at least two scintillation pulses includes determining, for any of the scintillation pulses, whether the first sampling data includes a higher trigger threshold of the trigger thresholds, and designating the scintillation pulse as the effective scintillation pulses, when the first sampling data includes the higher trigger threshold of the trigger thresholds.

According to some embodiments of the present disclosure, the step of superimposing one or more effective scintillation pulses, so as to acquire a target scintillation pulse includes amplifying the effective scintillation pulses by one or more first amplifying circuits provided in parallel, respectively, so as to obtain one or more amplified scintillation pulses; and amplifying an input intermediate scintillation pulse summed by one or more amplified scintillation pulses through a second amplifying circuit provided in series with the one or more first amplifying circuits provided in parallel, so as to obtain the target scintillation pulse.

According to some embodiments of the present disclosure, the plurality of sampling thresholds are determined based on empirical data and/or a priori information about the scintillation pulses, and a maximum sampling threshold among the plurality of sampling thresholds closes to a maximum amplitude of the scintillation pulses corresponding to the real single event.

According to some embodiments of the present disclosure, the step of determining, on the basis of the second sampling data, whether the target scintillation pulse corresponds to a real single event includes determining whether the second sampling data includes the maximum sampling threshold, and determining, if the second sampling data includes the maximum sampling threshold, that the target scintillation pulse corresponds to a real single event.

According to some embodiments of the present disclosure, the step of determining, on the basis of the second sampling data, whether the target scintillation pulse corresponds to a real single event includes performing pulse fitting of the target scintillation pulse based on the second sampling data, determining a fitted pulse waveform; determining an energy value corresponding to the target scintillation pulse based on the fitted pulse waveform; determining whether the energy value meets a preset condition; and determining that the target scintillation pulse corresponds to the real single event, when the energy value meets the preset condition.

According to some embodiments of the present disclosure, the target time information includes energy information, and the step of determining energy information includes determining the energy information based on the energy value, when the target scintillation pulse corresponds to the real single event.

According to some embodiments of the present disclosure, for any of the effective scintillation pulses, the first sampling data includes a first risetime at which the effective scintillation pulse first crosses a lower trigger threshold and a first fall time at which the lower trigger threshold is secondly crossed, and a second risetime at which a higher trigger threshold is firstly crossed and a second fall time at which the higher trigger threshold is secondly crossed.

According to some embodiments of the present disclosure, the event information includes time information, and the step of determining the time information includes determining a minimum risetime in a first risetime corresponding to one or more effective scintillation pulses, and assigning the minimum risetime as the time information.

According to some embodiments of the present disclosure, the event information includes time information, and the step of determining the time information includes determining a relative energy corresponding to each effective scintillation pulse, wherein the relative energy is a difference value between the second fall time and the first risetime, and assigning the first risetime corresponding to a maximum relative energy among the relative energies as the time information.

According to some embodiments of the present disclosure, at least two scintillation pulses are generated by the crystal channel of the radiation detection device, and the event information includes positional information, and the step of determining the positional information includes determining a position identifier of a crystal channel corresponding to an effective scintillation pulse corresponding to the time information, and assigning the position identifier as the positional information.

According to a second aspect of the present disclosure, a method for processing scintillation pulses is provided. The method includes presetting two trigger thresholds, and respectively performing multi-voltage threshold sampling on at least two scintillation pulses on the basis of the two trigger thresholds, so as to acquire first sampling data; superimposing the at least two scintillation pulses, so as to acquire a target scintillation pulse; presetting a plurality of sampling thresholds, and performing multi-voltage threshold sampling on the target scintillation pulse on the basis of the plurality of sampling thresholds, so as to acquire second sampling data; determining, on the basis of the second sampling data, whether the target scintillation pulse corresponds to a real single event; and determining event information of the real single event based on the first sampling data and the second sampling data, when the target scintillation pulse corresponds to the real single event.

According to some embodiments of the present disclosure, the step of superimposing the at least two scintillation pulses, so as to acquire a target scintillation pulse includes amplifying the at least two scintillation pulses by at least two first amplifying circuits provided in parallel, respectively, so as to obtain at least two amplified scintillation pulses; and amplifying an input intermediate scintillation pulse summed by the at least two amplified scintillation pulses through a second amplifying circuit provided in series with the at least two first amplifying circuits provided in parallel, so as to obtain the target scintillation pulse.

According to some embodiments of the present disclosure, the plurality of sampling thresholds are determined based on empirical data and/or a priori information about the scintillation pulses, and a maximum sampling threshold among the plurality of sampling thresholds closes to a maximum amplitude of the scintillation pulses corresponding to the real single event.

According to some embodiments of the present disclosure, the step of determining, on the basis of the second sampling data, whether the target scintillation pulse corresponds to a real single event includes determining whether the second sampling data includes the maximum sampling threshold, and determining, if the second sampling data includes the maximum sampling threshold, that the target scintillation pulse corresponds to a real single event.

According to some embodiments of the present disclosure, the step of determining, on the basis of the second sampling data, whether the target scintillation pulse corresponds to a real single event includes performing pulse fitting of the target scintillation pulse based on the second sampling data, determining a fitted pulse waveform; determining an energy value corresponding to the target scintillation pulse based on the fitted pulse waveform; determining whether the energy value meets a preset condition; and determining that the target scintillation pulse corresponds to the real single event, when the energy value meets the preset condition.

According to some embodiments of the present disclosure, the target time information includes energy information, and the step of determining energy information includes determining the energy information based on the energy value, when the target scintillation pulse corresponds to the real single event.

According to some embodiments of the present disclosure, the scintillation pulse in which the first sampling data includes a higher trigger threshold is the effective scintillation pulse. For any of the effective scintillation pulses, the first sampling data includes a first risetime at which the effective scintillation pulse first crosses a lower trigger threshold and a first fall time at which the lower trigger threshold is secondly crossed, and a second risetime at which a higher trigger threshold is firstly crossed and a second fall time at which the higher trigger threshold is secondly crossed.

According to some embodiments of the present disclosure, the event information includes time information, and the step of determining the time information includes determining a minimum risetime in a first risetime corresponding to one or more effective scintillation pulses, and assigning the minimum risetime as the time information.

According to some embodiments of the present disclosure, the event information includes time information, and the step of determining the time information includes determining a relative energy corresponding to each effective scintillation pulse, wherein the relative energy is a difference value between the second fall time and the first risetime, and assigning the first risetime corresponding to a maximum relative energy among the relative energies as the time information.

According to some embodiments of the present disclosure, at least two scintillation pulses are generated by the crystal channel of the radiation detection device, and the event information includes positional information, and the step of determining the positional information includes determining a position identifier of a crystal channel corresponding to an effective scintillation pulse corresponding to the time information, and assigning the position identifier as the positional information.

According to a third aspect of the present disclosure, an apparatus for processing scintillation pulses is provided. The apparatus includes a first sampling module, a first determining module, a first summing module, a second sampling module, a second determining module, and a first information acquisition module. The first sampling module is configured for presetting two trigger thresholds, and respectively performing multi-voltage threshold sampling on at least two scintillation pulses on the basis of the two trigger thresholds, so as to acquire first sampling data. The first determining module is configured for determining, on the basis of the first sampling data, one or more effective scintillation pulses from among the at least two scintillation pulses. The first summing module is configured for superimposing one or more effective scintillation pulses, so as to acquire a target scintillation pulse. The second sampling module is configured for presetting a plurality of sampling thresholds, and performing multi-voltage threshold sampling on the target scintillation pulse on the basis of the plurality of sampling thresholds, so as to acquire second sampling data. The second determining module is configured for determining, on the basis of the second sampling data, whether the target scintillation pulse corresponds to a real single event. The first information acquisition module is configured for determining event information of the real single event based on the first sampling data and/or the second sampling data, when the target scintillation pulse corresponds to the real single event.

According to some embodiments of the present disclosure, for determining, on the basis of the first sampling data, one or more effective scintillation pulses from among the at least two scintillation pulses, the first determining module is configured for determining, for any of the scintillation pulses, whether the first sampling data includes a higher trigger threshold of the trigger thresholds, and designating the scintillation pulse as the effective scintillation pulses, when the first sampling data includes the higher trigger threshold of the trigger thresholds.

According to some embodiments of the present disclosure, for superimposing one or more effective scintillation pulses, so as to acquire a target scintillation pulse, the first summing module is configured for amplifying the effective scintillation pulses by one or more first amplifying circuits provided in parallel, respectively, so as to obtain one or more amplified scintillation pulses; and amplifying an input intermediate scintillation pulse summed by one or more amplified scintillation pulses through a second amplifying circuit provided in series with the one or more first amplifying circuits provided in parallel, so as to obtain the target scintillation pulse.

According to some embodiments of the present disclosure, the plurality of sampling thresholds are determined based on empirical data and/or a priori information about the scintillation pulses, and a maximum sampling threshold among the plurality of sampling thresholds closes to a maximum amplitude of the scintillation pulses corresponding to the real single event.

According to some embodiments of the present disclosure, for determining, on the basis of the second sampling data, whether the target scintillation pulse corresponds to a real single event, the second determining module is configured for determining whether the second sampling data includes the maximum sampling threshold, and determining, if the second sampling data includes the maximum sampling threshold, that the target scintillation pulse corresponds to a real single event.

According to some embodiments of the present disclosure, for determining, on the basis of the second sampling data, whether the target scintillation pulse corresponds to a real single event, the second determining module is configured for performing pulse fitting of the target scintillation pulse based on the second sampling data, determining a fitted pulse waveform; determining an energy value corresponding to the target scintillation pulse based on the fitted pulse waveform; determining whether the energy value meets a preset condition; and determining that the target scintillation pulse corresponds to the real single event, when the energy value meets the preset condition.

According to some embodiments of the present disclosure, the target time information includes energy information. For determining energy information, the first information acquisition module is configured for determining, if the target scintillation pulse corresponds to a real single event, the energy information, based on the energy value.

According to some embodiments of the present disclosure, for any of the effective scintillation pulses, the first sampling data includes a first risetime at which the effective scintillation pulse first crosses a lower trigger threshold and a first fall time at which the lower trigger threshold is secondly crossed, and a second risetime at which a higher trigger threshold is firstly crossed and a second fall time at which the higher trigger threshold is secondly crossed.

According to some embodiments of the present disclosure, the event information includes time information. For determining the time information, the first information acquisition module is configured for determining a minimum risetime in a first risetime corresponding to one or more effective scintillation pulses, and assigning the minimum risetime as the time information.

According to some embodiments of the present disclosure, the event information includes time information. For determining the time information, the first information acquisition module is configured for determining a relative energy corresponding to each effective scintillation pulse, wherein the relative energy is a difference value between the second fall time and the first risetime, and assigning the first risetime corresponding to a maximum relative energy among the relative energies as the time information.

According to some embodiments of the present disclosure, at least two scintillation pulses are generated by the crystal channel of the radiation detection device, and the event information includes positional information. For determining the positional information, the first information acquisition module is configured for determining a position identifier of a crystal channel corresponding to an effective scintillation pulse corresponding to the time information, and assigning the position identifier as the positional information.

According to a fourth aspect of the present disclosure, an apparatus for processing scintillation pulses is provided. The apparatus includes a third sampling module, a second summing module, a fourth sampling module, a third determining module, and a second information acquisition module. The third sampling module is configured for presetting two trigger thresholds, and respectively performing multi-voltage threshold sampling on at least two scintillation pulses on the basis of the two trigger thresholds, so as to acquire first sampling data. The second summing module is configured for superimposing the at least two scintillation pulses, so as to acquire a target scintillation pulse. The fourth sampling module is configured for presetting a plurality of sampling thresholds, and performing multi-voltage threshold sampling on the target scintillation pulse on the basis of the plurality of sampling thresholds, so as to acquire second sampling data. The third determining module is configured for determining, on the basis of the second sampling data, whether the target scintillation pulse corresponds to a real single event. The second information acquisition module is configured for determining event information of the real single event based on the first sampling data and/or the second sampling data, when the target scintillation pulse corresponds to the real single event.

According to some embodiments of the present disclosure, for superimposing the at least two scintillation pulses, so as to acquire a target scintillation pulse, the second summing module is configured for amplifying the at least two scintillation pulses by at least two first amplifying circuits provided in parallel, respectively, so as to obtain at least two amplified scintillation pulses; and amplifying an input intermediate scintillation pulse summed by the at least two amplified scintillation pulses through a second amplifying circuit provided in series with the at least two first amplifying circuits provided in parallel, so as to obtain the target scintillation pulse.

According to some embodiments of the present disclosure, the plurality of sampling thresholds are determined based on empirical data and/or a priori information about the scintillation pulses, and a maximum sampling threshold among the plurality of sampling thresholds closes to a maximum amplitude of the scintillation pulses corresponding to the real single event.

According to some embodiments of the present disclosure, for determining, on the basis of the second sampling data, whether the target scintillation pulse corresponds to a real single event, the third determining module is configured for determining whether the second sampling data includes the maximum sampling threshold, and determining, if the second sampling data includes the maximum sampling threshold, that the target scintillation pulse corresponds to a real single event.

According to some embodiments of the present disclosure, for determining, on the basis of the second sampling data, whether the target scintillation pulse corresponds to a real single event, the third determining module is configured for performing pulse fitting of the target scintillation pulse based on the second sampling data, determining a fitted pulse waveform; determining an energy value corresponding to the target scintillation pulse based on the fitted pulse waveform; determining whether the energy value meets a preset condition; and determining that the target scintillation pulse corresponds to the real single event, when the energy value meets the preset condition.

According to some embodiments of the present disclosure, the target time information includes energy information. For determining energy information, the second information acquisition module is configured for determining, if the target scintillation pulse corresponds to a real single event, the energy information, based on the energy value.

According to some embodiments of the present disclosure, the first sampling data indicates that the scintillation pulse exceeding the higher trigger threshold among the two trigger thresholds is an effective scintillation pulse. For any of the effective scintillation pulses, the first sampling data includes a first risetime at which the effective scintillation pulse first crosses a lower trigger threshold and a first fall time at which the lower trigger threshold is secondly crossed, and a second risetime at which a higher trigger threshold is firstly crossed and a second fall time at which the higher trigger threshold is secondly crossed.

According to some embodiments of the present disclosure, the event information includes time information. For determining the time information, the second information acquisition module is configured for determining a minimum risetime in a first risetime corresponding to one or more effective scintillation pulses, and assigning the minimum risetime as the time information.

According to some embodiments of the present disclosure, the event information includes time information. For determining the time information, the second information acquisition module is configured for determining a relative energy corresponding to each effective scintillation pulse, wherein the relative energy is a difference value between the second fall time and the first risetime, and assigning the first risetime corresponding to a maximum relative energy among the relative energies as the time information.

According to some embodiments of the present disclosure, at least two scintillation pulses are generated by the crystal channel of the radiation detection device, and the event information includes positional information. For determining the positional information, the second information acquisition module is configured for determining a position identifier of a crystal channel corresponding to an effective scintillation pulse corresponding to the time information, and assigning the position identifier as the positional information.

According to a fifth aspect of the present disclosure, an apparatus for processing scintillation pulses is provided. The apparatus includes a scintillation pulse processing circuit board, wherein the processing circuit board is configured to perform multi-voltage threshold sampling on the scintillation pulses and implement the method for processing the scintillation pulses as described above.

According to a sixth aspect of the present disclosure, a processing device is provided. The processing device includes the apparatus for processing the scintillation pulse as described above.

According to a seventh aspect of the present disclosure, a processing device is provided. The processing device includes memory, a processor, and a computer program stored in the memory that can be executed on the processor. When the processor executes the computer program, it implements the steps of the method as described above.

According to an eighth aspect of the present disclosure, a computer-readable storage medium is provided. The storage medium stores a computer program. When executed by a processor, the computer program implements the steps of the method as described above.

A method and an apparatus for processing scintillation pulses, and a device and a storage medium are disclosed in the present disclosure, where time information and energy amplitude of the real single event can be determined by means of a double-threshold duration, such that the reliability is high, and mis-sampling is avoided. Simultaneously, by combining multi-voltage threshold sampling, the method can accurately restore the time information, position information, and energy information of incident high-energy particle.

BRIEF DESCRIPTION OF DRAWINGS

The present disclosure will be further explained in the form of exemplary embodiments, and the exemplary embodiments will be described in detail with reference to the drawings. These embodiments are not restrictive, and in these embodiments, identical reference numerals denote identical structures.

FIG. 1 is an exemplary flowchart of a method for processing scintillation pulse according to some embodiments of the present disclosure;

FIG. 6 is an exemplary flowchart of another method for processing scintillation pulse according to some embodiments of the present disclosure;

DETAILED DESCRIPTION OF EMBODIMENTS

Figure 2:
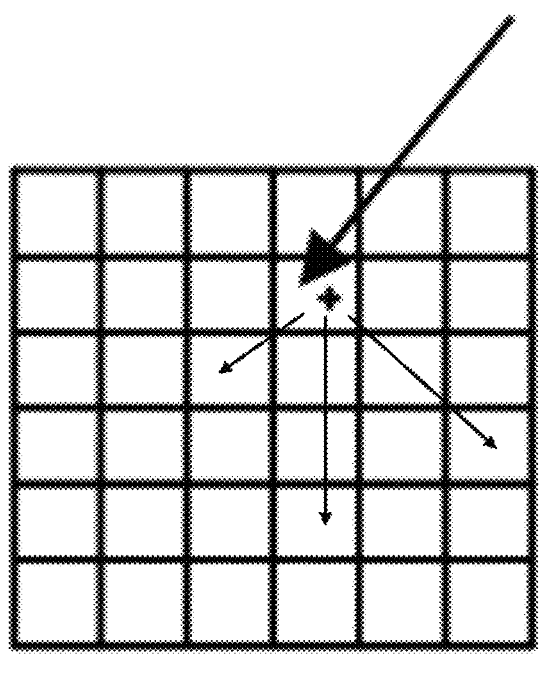
FIG. 2 is an exemplary schematic diagram of a crystal channel of a radiation detection device according to some embodiments of the present disclosure.

In order to make the above objects, features, and advantages of the present disclosure more apparent and understandable, specific embodiments of the present disclosure are described in detail below in conjunction with the drawings. Many specific details are set forth in the following description to facilitate a full understanding of the present disclosure. However, the present disclosure can be implemented in many other ways different from those described herein, and those skilled in the art can make similar improvements without violating the connotations of the present disclosure, and thus the present disclosure is not limited by the specific embodiments disclosed below.

It should be clarified that when an element is described as being “fixed” to another element, it can be directly fixed to the other element, or there can be an intermediary element. When an element is said to be “connected” to another element, it can be directly connected to the other element or can have an intermediary element. The terms used herein, such as “vertical”, “horizontal”, “left”, “right”, and similar expressions, are used for explanatory purposes.

Unless otherwise defined, all technical and scientific terms used herein have the same meaning as commonly understood by one of ordinary skill in the technical field of the present disclosure. The terms used in the specification of the present disclosure are intended solely for the objective of describing specific embodiments and are not intended to limit the present disclosure. The terms “and/or” or “and/or” as used herein include any and all combinations of one or more of the listed items.

Some preferred embodiments of the present disclosure will be described below with reference to the drawings. It should be noted that the following description is for illustrative purposes and is not intended to limit the scope of protection of the present disclosure.

FIG. 1 is an exemplary flowchart of a method for processing scintillation pulse according to some embodiments of the present disclosure. In some embodiments, the scintillation pulse processing method 100 can be executed by the first data processing system 800. For example, the scintillation pulse processing method 100 can be stored in the form of a program or instructions in a storage device (such as a built-in storage unit or an external storage device of the first data processing system 800). When the program or instructions are executed, the scintillation pulse processing method 100 can be implemented. As shown in FIG. 1, the scintillation pulse processing method 100 can include the following steps.

Step 110: presetting two trigger thresholds, and respectively performing multi-voltage threshold sampling on at least two scintillation pulses on the basis of the two trigger thresholds, so as to acquire first sampling data.

In some embodiments, the at least two scintillation pulses can be obtained through a radiation detection device, such as a scintillation detector. The scintillation detector can include scintillation crystals and photoelectric conversion devices coupled to each other. The scintillation crystal (e.g., BGO, PWO, LYSO: Ce, GAGG: Ce, NaI: TI, CsI: TI, $LaBr_3$: Ce, and $BaF_2$) is configured to convert detected high-energy radiation (such as gamma rays or neutron rays) into visible light signals. The photoelectric conversion device (such as photomultiplier tube PMT and silicon photomultiplier SiPM) is configured to convert the visible light signal into an electrical signal. The electrical signal is output in the form of scintillation pulses through electronic devices connected to the photoelectric conversion device.

Figure 5:
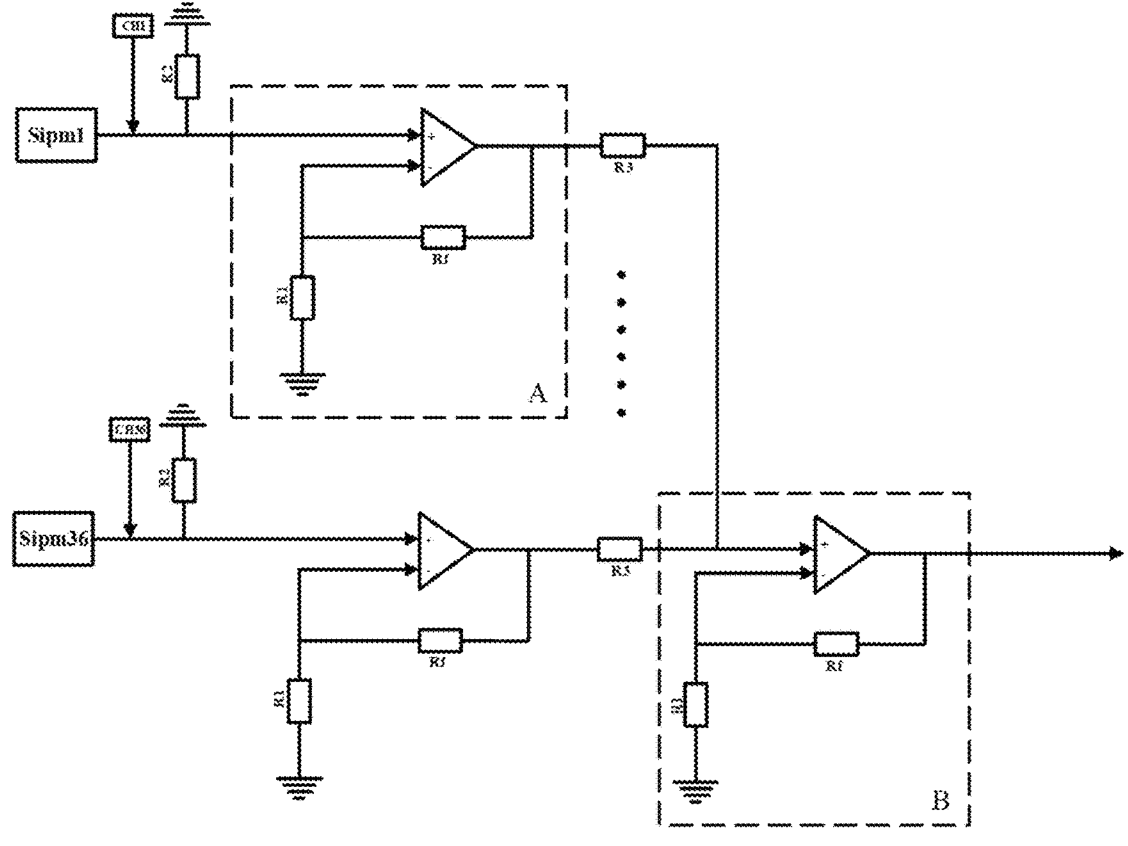
FIG. 5 is an exemplary schematic diagram of a scintillation pulse summation circuit according to some embodiments of the present disclosure.

FIG. 2 illustrates an exemplary schematic diagram of a crystal channel of a radiation detection device according to some embodiments of the present disclosure. The crystals of the radiation detection device (e.g., scintillation detector) can include multiple independent crystal channels. For example, the crystals can be regularly cut or divided, and each independent portion is coupled with a photoelectric conversion device (e.g., silicon photomultiplier SiPM) to form a crystal channel. As shown in FIG. 2, the scintillation detector includes 6×6=36 independent crystal channels. When a high-energy particle (e.g., gamma photon) enters a particular crystal channel (e.g., the 10th crystal channel in FIG. 5), energy deposition occurs in the crystal channel. The photoelectric conversion device coupled with the crystal channel generates a scintillation pulse signal. This process can be referred to as a single event. However, the above process does not consider photon scattering. In practice, when a gamma photon enters a particular crystal channel (that is, after it is incident into the crystal), Compton scattering can occur. The energy of the gamma photon changes, and its direction shifts, leading to energy deposition across multiple crystal channels, thereby producing multiple scintillation pulses. In other words, when a gamma photon is captured by the scintillation detector, single events can occur in multiple channels. As shown in FIG. 5, after entering the 10th crystal channel, the gamma photon undergoes Compton scattering. Following the directional shift, energy deposition occurs in the 15th crystal channel, 24th crystal channel, and 28th crystal channel. Thus, a single gamma photon can generate four single events. These single events include target single events and scattered single events. The target single event refers to the energy deposition that first occurs in a crystal channel, thus producing a scintillation pulse. The scattered single events refer to scintillation pulses generated in other crystal channels due to photon scattering. During the sampling process of scintillation pulses, the desired event is a real single event. In other words, this refers to the event where a target high-energy particle (e.g., a gamma photon) enters a crystal channel, deposits energy, and generates a scintillation pulse. Noise signals generated due to other factors (e.g., equipment status changes) need to be excluded, and multiple scintillation pulses caused by scattering need to be restored. For example, the scintillation pulses corresponding to the target single event and scattered single events can be superimposed and restored to make subsequent calculations more accurate.

In some embodiments, the two trigger thresholds can be used to compare with the amplitude of the scintillation pulse to determine the time points when the amplitude of the scintillation pulse crosses the trigger thresholds. Comparing the scintillation pulse with two trigger thresholds can effectively avoid the misdetection of noise signals. In some embodiments, the types of the two trigger thresholds can be determined based on the forms of the scintillation pulse. For instance, a scintillation pulse can be an electrical pulse, acoustic pulse, thermal pulse, or pressure wave signal. The energy indicators representing the scintillation pulse can include voltage, current, sound intensity, heat, or pressure. Thus, the thresholds can be voltage thresholds, current thresholds, sound intensity thresholds, heat thresholds, pressure thresholds, etc.

In some embodiments, the two thresholds can be determined based on empirical data and/or prior information about the scintillation pulse. For example, taking electrical pulses as an instance, analysis of summary data of numerous electrical pulses caused by high-energy particles emitted from a radiation source can show that scintillation pulses sometimes have relatively low amplitudes. However, direct sampling can require setting thresholds very low, which is not conducive to the sampling process. Therefore, the scintillation pulse can be "padded" to a certain extent to increase the amplitude of the scintillation pulse. Exemplarily, the padding height can be set to 625 mV. Additionally, based on prior data, the maximum amplitude of noise signals is generally around 50 mV. Thus, the two trigger thresholds can be set to 635 mV and 675 mV. In other words, the higher trigger threshold can be set 50 mV above the padding height of 625 mV. This configuration can effectively filter out noise signals during the sampling process.

Figure 3:
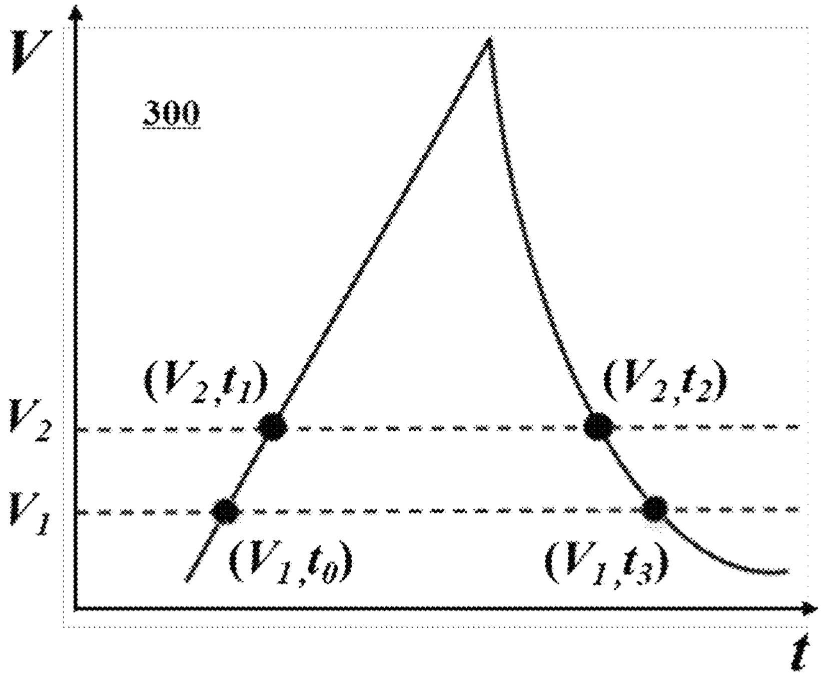
FIG. 3 is an exemplary schematic diagram of scintillation pulse sampling according to some embodiments of the present disclosure.

FIG. 3 illustrates an exemplary schematic diagram of scintillation pulse sampling according to some embodiments of the present disclosure. As shown in FIG. 3, one scintillation pulse 300 of the at least two scintillation pulses is an electrical pulse, with two trigger thresholds set as $V_1$ and $V_2$, where $V_1<V_2$. As time goes on, the rising edge of scintillation pulse 300 crosses the trigger threshold $V_1$ from the bottom to the top at the time $t_0$ and crosses the trigger threshold $V_2$ from the bottom to the top at the time $t_1$. Subsequently, the falling edge of scintillation pulse 300 crosses the trigger threshold $V_2$ from the top to the bottom at the time $t_2$ and crosses the trigger threshold $V_1$ from the top to the bottom at the time $t_3$. The resulting four sampled data points include $(V_1, t_0)$, $(V_2, t_1)$, $(V_2, t_2)$, and $(V_1, t_3)$. Of course, among the at least two scintillation pulses, there can also be pulses that cross only one trigger threshold or do not cross any trigger threshold. All sampled data points collectively constitute the first sampling data.

It should be understood that in actual sampling, pulse waveforms are not as smooth as illustrated in FIG. 3; instead, they exhibit significant fluctuations. The fluctuations manifest as upward oscillation or downward oscillation within the upper and lower ranges of the waveforms shown in FIG. 3. The smooth waveform shown in FIG. 3 is for illustrative purposes only. Therefore, during actual sampling, the waveform can cross the same threshold multiple times within a very short period during the rising edge or falling edge. The actual sampling can use the average time of multiple crossings of the same threshold within a time window or time period as the time at which the threshold is crossed. This approach is straightforward for those skilled in the art based on the teachings of the present disclosure and will not be further elaborated here.

Figure 4:
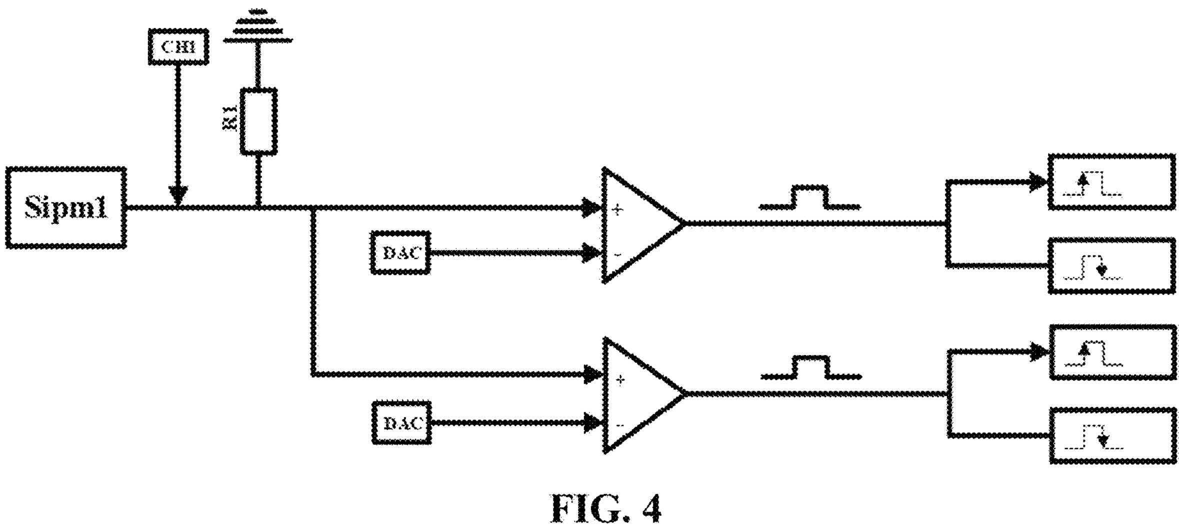
FIG. 4 is an exemplary schematic diagram of a scintillation pulse sampling circuit according to some embodiments of the present disclosure.

FIG. 4 illustrates an exemplary schematic diagram of a scintillation pulse sampling circuit according to some embodiments of the present disclosure. For instance, the sampling circuit shown in FIG. 4 can sample the at least two scintillation pulses using two trigger thresholds to obtain the first sampling data. As shown in FIG. 4, CH1 can represent the index of a crystal channel, shown here as an example of the first crystal channel. Simp1 can represent a photoelectric conversion device (e.g., a silicon photomultiplier) coupled to the first crystal channel The scintillation pulse output by Simp1 is input into two parallel comparators. For example, in some implementations, the comparators can be implemented via LVDS (low-voltage differential signaling) pins of an FPGA chip on the circuit board (in this case, the circuit board can be referred to as an MVT sampling board). Each LVDS comparator receives the input of a scintillation pulse and a trigger threshold. For instance, two DACs (digital-to-analog converters) can be used to input the preset two trigger thresholds (e.g., $V_1$ and $V_2$) into the two LVDS comparators, respectively. Each comparator is connected to two TDCs (time-to-digital converters), which are configured to determine the sampling time point of the rising edge and the sampling time point of the falling edge of the scintillation pulse. For example, when the scintillation pulse crosses a trigger threshold, the comparator can output a state transition signal. The TDC can perform time digitization sampling of the state transition signal to determine the time. For instance, the two TDCs connected to the first comparator are configured to determine the time $t_0$ when the rising edge of the scintillation pulse crosses the trigger threshold $V_1$ from the bottom to the top and the time $t_3$ when the falling edge crosses the trigger threshold $V_1$ from the top to the bottom. The two TDCs connected to the second comparator are configured to determine the time $t_1$ when the rising edge of the scintillation pulse crosses the trigger threshold $V_2$ from the bottom to the top and the time $t_2$ when the falling edge crosses the trigger threshold $V_2$ from the top to the bottom. Of course, if a scintillation pulse does not cross a trigger threshold, the comparator does not output a signal to the TDC.

Step 120: determining, on the basis of the first sampling data, one or more effective scintillation pulses from among the at least two scintillation pulses.

In some embodiments, for any of the scintillation pulses, it is possible to determine whether the scintillation pulse is an effective scintillation pulse by verifying if the first sampling data includes the higher trigger threshold. In step 110, setting two trigger thresholds can limit the energy amplitude required for a single event, thus effectively filtering noise signals and ensuring high reliability. Continuing with the aforementioned example, among the two set trigger thresholds $V_1$ and $V_2$, $V_1<V_2$. Thus, it can be determined whether the first sampling data includes sampling point data corresponding to the scintillation pulse crossing $V_2$. If the first sampling data does not include sampling point data corresponding to the scintillation pulse crossing $V_2$, this indicates that the scintillation pulse has not crossed the higher trigger threshold and is classified as a noise signal. If the first sampling data includes sampling point data corresponding to the scintillation pulse crossing $V_2$, this indicates that the scintillation pulse is an effective scintillation pulse, which is a scintillation pulse corresponding to the aforementioned target single event or scatter single event.

Step 130: superimposing one or more effective scintillation pulses, so as to acquire a target scintillation pulse.

From the previous explanation, when high-energy particles (e.g., gamma photons) enter the crystal channel and scatter, the energy disperses. To ensure accurate energy calculation, the effective scintillation pulses can be superimposed. The resulting energy amplitudes of the target scintillation pulses will then be the sum of the energy of the amplitudes of the valid scintillation pulses. Processing the target scintillation pulse leads to more accurate results.

In some embodiments, one or more first amplifying circuits arranged in parallel can amplify one or more effective scintillation pulses individually to obtain one or more first amplifying scintillation pulses. A second amplifying circuit, provided in series with the one or more first amplifying circuits provided in parallel, can amplify an input intermediate scintillation pulse summed by one or more first amplified scintillation pulses, so as to obtain a second amplifying scintillation pulse. Based on the second amplifying scintillation pulse, the target scintillation pulse can be determined. An exemplary illustration is provided with reference to FIG. 5. FIG. 5 is an exemplary schematic diagram of an addition circuit configured for scintillation pulse superimposition according to some embodiments of the present disclosure. As shown in FIG. 5, CH1 to CH36 represent the indices of crystal channels, with a total of 36 crystal channels. Simp1 to Simp36 represent photoelectric conversion devices (e.g., silicon photomultipliers) coupled to the crystal channels. Each scintillation pulse output by the photoelectric conversion devices (if present and identified as an effective scintillation pulse) is input into its corresponding first amplifying circuit, as illustrated by the dashed box A in FIG. 5. The amplification value $k_1=1+(R_f/R_1)$ of the first amplifying circuit can be determined by resistors $R_1$ and $R_f$ in the circuit. The amplification for effective scintillation pulses can be the energy amplification, that is, the increase of the maximum amplitude. Each effective scintillation pulse processed by the first amplifying circuit is summed to generate the intermediate scintillation pulse. For example, if the energy is replaced by the maximum amplitude and $E_n$ ($1 \leq n \leq_{36}$) is assumed to represent the maximum amplitude of the first amplified scintillation pulse output by the first amplifying circuit, the maximum amplitude $$E_m = \sum_{i=1}^{36} (k_1 \times E_n)$$

of the intermediate scintillation pulse after summation is $$E_m = \sum_{i=1}^{36} (k_1 \times E_n).$$

The second amplifying circuit (illustrated as the dashed box B in FIG. 5), connected in series with the multiple parallel first amplifying circuits, receives the intermediate scintillation pulse and performs the second amplification. The amplification value $k_2=1+(R_f/R_1)$ of the second amplifying circuit can be determined by resistors $R_1$ and $R_f$ in the circuit. Thus, the maximum amplitude of the scintillation pulse output by the second amplifying circuit (i.e., the target scintillation pulse) can be $$EGY = k_2 \times \sum_{i=1}^{36} (k_1 \times E_n).$$

Amplifying and summing the pulses reduces the proportion of residual noise signals, which may be present in the preceding steps and have not been eliminated, in the target scintillation pulse, thus increasing the signal-to-noise ratio of the pulse signal and enhancing anti-interference capability.

Step 140: presetting a plurality of sampling thresholds, and performing multi-voltage threshold sampling on the target scintillation pulse on the basis of the plurality of sampling thresholds, so as to acquire second sampling data.

In some embodiments, the plurality of sampling thresholds can be determined based on empirical data and/or prior information about the scintillation pulse. For example, taking an electrical pulse as an example, by analyzing the summary data of numerous electrical pulses caused by high-energy particles emitted from a radiation source, it is determined that the baseline voltage of the radiation source, amplified by the same factor (that is, $k_1 \times k_2$ times magnification) used for obtaining the target scintillation pulse, is approximately 69 mV (with baseline voltage reduction due to DC isolation during amplification). Thus, the minimum sampling threshold among the sampling thresholds can be set at approximately 50-60 mV higher than 69 mV. For instance, the minimum sampling threshold can be set at 120 mV. The plurality of sampling thresholds can also be set based on the maximum amplitude of the scintillation pulse corresponding to a real single event. For example, in PET detection, the energy of a pair of gamma photons produced by annihilation is 511 keV, and the maximum amplitude of its corresponding scintillation pulse, after amplification, is close to 400 mV. When a gamma photon enters the crystal channel and deposits energy, if no scattering occurs, the maximum amplitude of the scintillation pulse generated by the coupled photoelectric conversion device, after amplification, will also be close to 400 mV. Thus, the maximum sampling threshold among the plurality of sampling thresholds can be set close to or equal to 400 mV. This ensures that the resulting sampling data better restores the waveform and energy of the scintillation pulse corresponding to a real single event. When setting the plurality of sampling thresholds, the amplification process for obtaining the target scintillation pulse is taken into account.

In some embodiments, the intervals between the plurality of sampling thresholds can be equal. In other words, the plurality of sampling thresholds form an arithmetic sequence. For instance, assuming the minimum sampling threshold of the plurality of sampling thresholds is 120 mV and the maximum sampling threshold is 400 mV, eight sampling thresholds can be set with a threshold interval of 40 mV: 120 mV, 160 mV, 200 mV, 240 mV, 280 mV, 320 mV, 360 mV, and 400 mV. Other threshold intervals, such as 10 mV, 20 mV, or 30 mV, are also possible. The present disclosure does not impose specific limitations. In other embodiments, the intervals between the plurality of sampling thresholds can be unequal. For example, the threshold interval increases with the number of sampling thresholds. For example, the interval between the smallest and the second smallest sampling thresholds can be 10 mV, and the interval between the second smallest and the third smallest sampling thresholds can be 20 mV, and so on.

In some embodiments, other characteristics of the sampling thresholds can be identical or similar to those of the trigger thresholds. For example, the sampling thresholds can also be presented as the voltage thresholds, current thresholds, sound intensity thresholds, heat thresholds, or pressure thresholds, according to the form of the scintillation pulse.

In some embodiments, the sampling circuit configured to perform sampling on the target scintillation pulse based on the plurality of sampling thresholds can resemble the sampling circuit shown in FIG. 4. The distinction lies in the inclusion of a plurality of parallel comparators equal in number to the sampling thresholds. For example, if there are eight sampling thresholds, the sampling circuit can include eight comparators, and each comparator receives the target scintillation pulse and a sampling threshold as inputs. Similarly, a DAC can be configured to set the sampling thresholds. Each comparator is connected to two TDCs. When the target scintillation pulse crosses a sampling threshold, the comparator outputs a state transition signal. The TDC can perform time digitization sampling of the state transition signal to determine the time. When the target scintillation pulse crosses all eight sampling thresholds, the TDC can determine 16 time points. Ultimately, up to 16 threshold-time pairs can be obtained after sampling. These threshold-time pairs constitute the second sampling data.

Step 150: determining, on the basis of the second sampling data, whether the target scintillation pulse corresponds to a real single event.

In some embodiments, whether the second sampling data includes the maximum sampling threshold can be determined based on whether the target scintillation pulse corresponds to a real single event. The step of setting sampling thresholds as described above, in conjunction with the step of setting the maximum sampling threshold as the maximum amplitude closing to the scintillation pulse corresponding to a real single event, can effectively filter real single events. If the second sampling data includes the threshold-time pair corresponding to the maximum sampling threshold, the target scintillation pulse can be considered to correspond to a real single event. That is, one or more effective scintillation pulses of the target scintillation pulse formed by superimposition (e.g., two or more) include a target single event and a scattered single event (e.g., in the case of scattering), or the effective scintillation pulse itself corresponds to a real single event (e.g., in the case of no scattering). Otherwise, one or more effective scintillation pulses of the target scintillation pulse formed by superimposition can correspond to scattered single events, and energy calculation is unnecessary, so they can be entirely discarded.

In some embodiments, the second sampling data can be used to fit the target scintillation pulse. Exemplarily, a function model used to describe the waveform shape of the target scintillation pulse can first be determined, hypothetically denoted as $y=a*f(x)+b$, with the parameters to be fitted being a and b. The thresholds in the threshold-time pairs included in the second sampling data are taken as y, and the times as x, to constitute fitting data. Function fitting is performed by the least squares method to determine the parameters a and b to be fitted. The expression of the function model after the parameters are determined can be used to describe the fitted pulse waveform of the target scintillation pulse, for example, presented as a curve shape in the coordinate system.

In some embodiments, based on the fitted pulse waveform, the energy value corresponding to the target scintillation pulse can be determined. For example, by integrating the fitted pulse waveform, the obtained integration value can be the aforementioned energy value. By determining whether the energy value satisfies preset conditions, it can be determined whether the target pulse corresponds to a real single event. It can be known that high-energy particles causing scintillation pulses to occur have a fixed energy value. For example, the energy of a gamma photon is 511 keV. Exemplarily, the preset condition can be that the energy value, after being reduced (e.g., by the reduction factor being the amplification factor used when obtaining the target scintillation pulse), is greater than or equal to 511 keV. If the energy value of the target pulse, after being reduced, is greater than or equal to 511 keV, it can be considered that the energy value is an effective energy value, and the target scintillation pulse corresponds to a real single event. One or more effective scintillation pulses of the target scintillation pulse formed by superimposition (e.g., two or more) include a target single event and a scattered single event (e.g., in the case of scattering), or the effective scintillation pulse itself corresponds to a real single event (e.g., in the case of no scattering). Otherwise, one or more effective scintillation pulses of the target scintillation pulse formed by superimposition can correspond to scattered single events, and energy calculation is unnecessary, so they can be entirely discarded.

Step 160: determining event information of the real single event based on the first sampling data and the second sampling data, when the target scintillation pulse corresponds to the real single event.

In some embodiments, the event information can include energy information. The energy information is used to indicate the energy value of the scintillation pulse corresponding to the real single event. When the target scintillation pulse, formed by superimposing one or more effective scintillation pulses, corresponds to a real single event, it indicates that one or more effective scintillation pulses are triggered by energy deposition (regardless of whether scattering occurs or not), which is caused by target high-energy particles (e.g., gamma photons in a PET system) entering the crystal channel. They belong to pulse signals that need to be sampled. At this time, the energy value corresponding to the target scintillation pulse can, after being reduced, be designated as the energy information.

In some embodiments, the event information can further include time information. The time information can be used to indicate the moment when the real single event occurs. It can be understood that for one or more effective scintillation pulses, they must include the scintillation pulse corresponding to the target single event (in the case of no scattering), and also include the scintillation pulse corresponding to a scattered single event (in the case of scattering). Based on the characteristics of the scintillation pulses, it can be known that the scintillation pulse corresponding to the target single event has the highest energy and occurs first. Therefore, the time information can be determined based on the sampling data of the scintillation pulse corresponding to the target single event.

In some embodiments, for any of the effective scintillation pulses, the first sampling data can include a first risetime at which the effective scintillation pulse first crosses a lower trigger threshold of the two trigger thresholds and a first fall time at which the lower trigger threshold is secondly crossed, and a second risetime at which a higher trigger threshold is firstly crossed and a second fall time at which the higher trigger threshold of the two trigger thresholds is secondly crossed. Referring to FIG. 3, the first risetime can be $t_0$, the first fall time can be $t_3$. The second risetime can be $t_1$, and the second fall time can be $t_2$. The time when the effective scintillation pulse first crosses the threshold can be considered as the time when the high-energy particle arrives at the crystal channel and triggers the corresponding single event, which is denoted as $T\_S=t_0$. By comparing the minimum risetime among the first risetimes corresponding to one or more effective scintillation pulses, the time information can be determined. Exemplarily, by determining the magnitude of T_S for all effective scintillation pulses, the smallest T_S can be determined as the time information, serving as the occurrence time of the real single event.

In some embodiments, the energy of the effective scintillation pulse can also be represented using the pulse width. For example, the higher the energy of the scintillation pulse, the greater its amplitude and the longer its duration. Thus, the duration of crossing a threshold will also be longer. The pulse width can also be referred to as the relative energy of the effective scintillation pulse. In the present disclosure, the first sampling data can be used to determine the relative energy and to determine which effective scintillation pulse corresponds to the target true event. In some embodiments, the difference value between the second fall time and the first risetime can be used as the relative energy. That is, the relative energy is $E\_s=t_2-t_0$. In conventional approaches, a threshold is typically used for determination, which is simpler to implement but prone to interference and less reliable. The double-threshold method used in the present disclosure to determine pulse width can limit the energy amplitude required for events and have higher reliability. After determining the relative energy of all effective scintillation pulses, the first risetime corresponding to a maximum relative energy among the relative energies can be assigned as the time information. That is, the first risetime of the effective scintillation pulse with the maximum relative energy can be used as the time information of the real single event.

In some embodiments, the event information can further include positional information. The positional information can be used to indicate the position where the real single event occurs. In conjunction with the foregoing description, one or more effective pulse signals can be generated by the crystal channel of the radiation detection device. For example, high-energy particles enter the crystal channel, deposit energy, and generate scintillation pulses via coupled photoelectric conversion components. After each scintillation pulse is generated, the crystal channel that generates the scintillation pulse can be recorded and stored. To determine the positional information, the position identifier of the crystal channel corresponding to the effective scintillation pulse related to the time information can be identified. The effective scintillation pulse is essentially the earliest generated scintillation pulse, and the real single event occurs in its corresponding crystal channel. Therefore, the position identifier of the crystal channel (e.g., the 10th crystal channel as shown in FIG. 2) can be used as the positional information of the real single event.

It should be noted that the descriptions of the steps in FIG. 1 above are merely for exemplification and explanation, and do not limit the scope of the present disclosure. For those skilled in the art, various modifications and changes to the steps in FIG. 1 can be made under the guidance of the present disclosure. However, these modifications and changes still fall within the scope of the present disclosure.

The first data processing system 800 disclosed in the present disclosure for implementing the exemplary process 100 can be a device with extensive computational resources (e.g., computer, server, and cloud computing) or a device with limited computational resources (such as FPGA chip board and ASIC chip board).

A method for processing scintillation pulses is disclosed in the present disclosure, where the energy amplitude of a real single event is limited by means of a double-threshold duration, such that the reliability is high, and mis-sampling is avoided. Simultaneously, by combining multi-voltage threshold sampling, the method can accurately restore the time information, positional information, and energy information of high-energy particle incidence.

FIG. 6 is an exemplary flowchart of a method for processing scintillation pulse according to some embodiments of the present disclosure. In some embodiments, the scintillation pulse processing method 600 can be executed by the second data processing system 900. For example, the scintillation pulse processing method 600 can be stored in the form of a program or instructions in a storage device (such as a built-in storage unit or an external storage device of the second data processing system 900). When the program or instructions are executed, the scintillation pulse processing method 600 can be implemented. As shown in FIG. 6, the scintillation pulse processing method 600 can include the following steps.

Step 610: presetting two trigger thresholds, and respectively performing multi-voltage threshold sampling on at least two scintillation pulses on the basis of the two trigger thresholds, so as to acquire first sampling data.

Step 620: superimposing the at least two scintillation pulses, so as to acquire a target scintillation pulse.

Step 630: presetting a plurality of sampling thresholds, and performing multi-voltage threshold sampling on the target scintillation pulse on the basis of the plurality of sampling thresholds, so as to acquire second sampling data.

Step 640: determining, on the basis of the second sampling data, whether the target scintillation pulse corresponds to a real single event.

Step 650: determining target event information of the real single event based on the first sampling data and the second sampling data, when the target scintillation pulse corresponds to the real single event.

The difference between step 600 and step 100 lies in the acquisition of the target scintillation pulse, where the at least two scintillation pulses can be directly superimposed without the need to filter out noise signals. During the acquisition of the target scintillation pulse, amplification and summation can reduce the proportion of noise signals in the target scintillation pulse, thereby diminishing the interference effect of noise signals. This can improve the signal-to-noise ratio of the target scintillation pulse and enhance anti-interference capability.

Figures 7, 8:
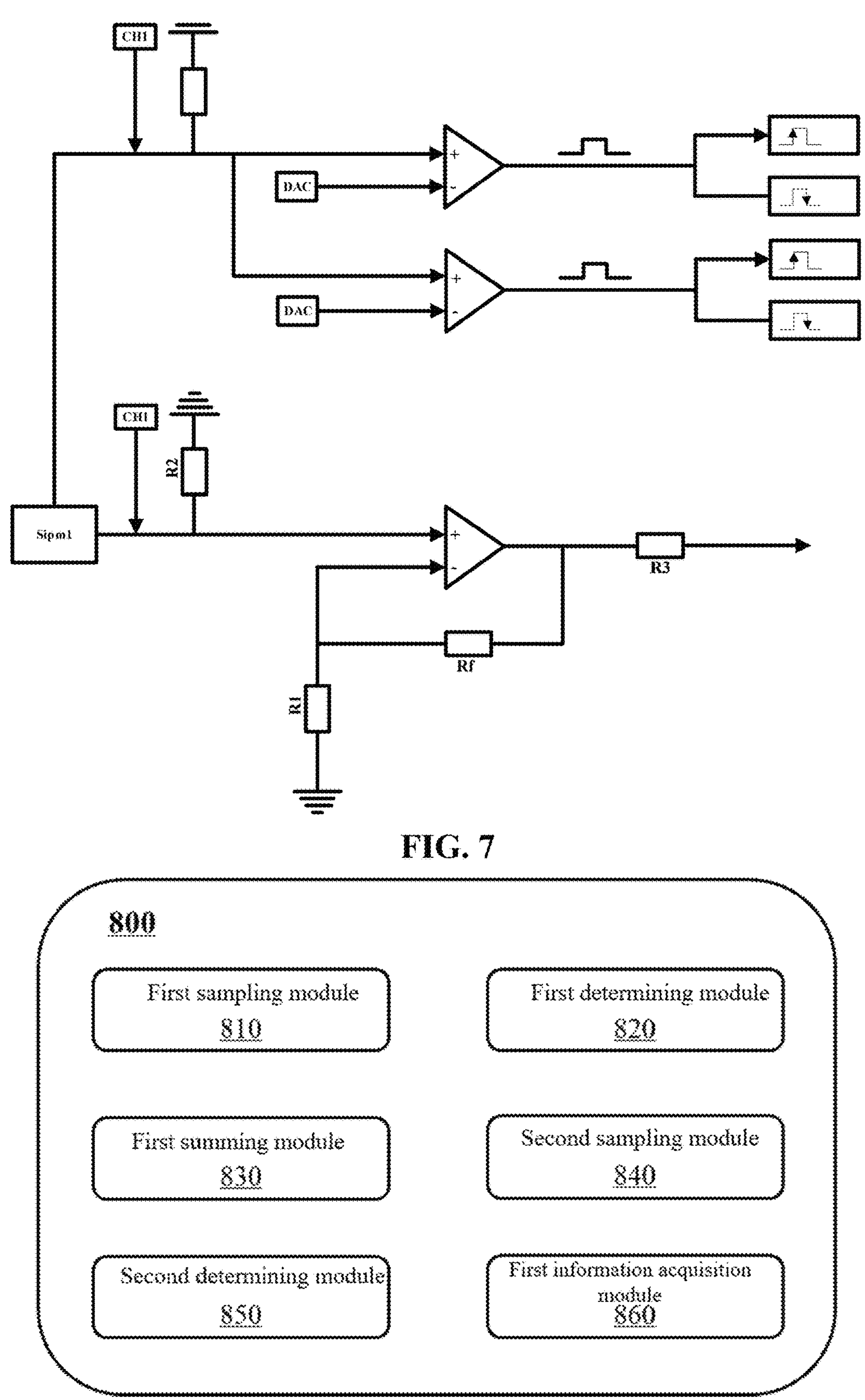
FIG. 7 is an exemplary schematic diagram of a scintillation pulse processing circuit according to some embodiments of the present disclosure.
FIG. 8 is an exemplary block diagram of a data processing system for scintillation pulse processing according to some embodiments of the present disclosure.

FIG. 7 is an exemplary schematic diagram of a scintillation pulse processing circuit according to some embodiments of the present disclosure. Referring to FIG. 7 and in conjunction with FIGS. 4 and 5, the signal flow path of process 600 is illustrated using the scintillation pulse output by a crystal channel (e.g., Simp1) as an example. The scintillation pulse output by Simp1 can be output to two comparators arranged in parallel for comparison with two trigger thresholds, to perform sampling and acquire the first sampling data. Simultaneously, the scintillation pulse output by Simp1 can be input into the first amplifying circuit for amplification to obtain the amplified scintillation pulse. The amplified scintillation pulses are then summed with the amplified scintillation pulses output from the other crystal channels, which have been amplified by the respective first amplifying circuits. The summed pulses are then input into the second amplifying circuit for amplification to obtain the target scintillation pulse.

In process 600, there is no need to identify effective scintillation pulses, which do not affect the final result. This can further save computational resources, reduce computational time, and improve efficiency.

The second data processing system 900 disclosed in the present disclosure for implementing the exemplary process 600 can be a device with extensive computational resources (e.g., computer, server, and cloud computing) or a device with limited computational resources (e.g., FPGA chip board, ASIC chip board, etc.). The second data processing system 900 can be the same system as the first data processing system 800. When implementing process 600, the module in the first data processing system 800 configured for determining effective scintillation pulses can remain inactive.

It should be noted that the descriptions of the steps in FIG. 6 above are merely for exemplification and explanation, and do not limit the scope of the present disclosure. For those skilled in the art, various modifications and changes to the steps in FIG. 6 can be made under the guidance of the present disclosure. However, these modifications and changes still fall within the scope of the present disclosure.

FIG. 8 is an exemplary module diagram of a data processing system according to some embodiments of the present disclosure. The data processing system can achieve precise sampling of scintillation pulses. As shown in FIG. 8, the first data processing system 800 can include a first sampling module 810, a first determining module 820, a first summing module 830, a second sampling module 840, a second determining module 850, and a first information acquisition module 860.

The first sampling module 810 can implement the above step 110 of presetting two trigger thresholds, and respectively performing multi-voltage threshold sampling on at least two scintillation pulses on the basis of the two trigger thresholds, so as to acquire first sampling data. The at least two scintillation pulses can be generated by at least two crystal channels of the radiation detection device. The two trigger thresholds can be used to compare with the amplitude of the scintillation pulse to determine the time points when the amplitude of the scintillation pulse crosses the trigger thresholds. Comparing the scintillation pulse with two trigger thresholds can effectively avoid the misdetection of noise signals. The first sampling module 810 can utilize two comparators arranged in parallel to compare the scintillation pulse with two trigger thresholds. When the scintillation pulse crosses a trigger threshold, the comparator can output a state transition signal. The first sampling module 810 can utilize two time-to-digital converters to perform time digitization sampling of the state transition signal to determine the transition time. In this way, the threshold-time pair composed of the trigger threshold and the corresponding transition time can be the first sampling data.

The first determining module 820 can implement the above step 120 of determining, on the basis of the first sampling data, one or more effective scintillation pulses from among the at least two scintillation pulses. For any of the scintillation pulses, the first determining module 820 can determine whether the scintillation pulse is an effective scintillation pulse by verifying if the first sampling data includes the higher trigger threshold. When the first determining module 820 determines that the first sampling data includes relevant sampling point data (e.g., threshold-time pair) of the scintillation pulse crossing the higher trigger threshold, the scintillation pulse can be determined as an effective scintillation pulse.

The first summing module 830 can implement the above step 130 of superimposing one or more effective scintillation pulses, so as to acquire a target scintillation pulse. Through the first summing module 830, one or more first amplifying circuits arranged in parallel can amplify one or more effective scintillation pulses individually to obtain one or more first amplifying scintillation pulses. A second amplifying circuit, provided in series with the one or more first amplifying circuits provided in parallel, can amplify an input intermediate scintillation pulse summed by one or more first amplified scintillation pulses, so as to obtain a second amplifying scintillation pulse. Amplifying and summing the pulses reduces the proportion of residual noise signals, which may be present in the preceding steps and have not been eliminated, in the target scintillation pulse, thus increasing the signal-to-noise ratio of the pulse signal and enhancing anti-interference capability.

The second sampling module 840 can implement the above step 140 of presetting a plurality of sampling thresholds, and performing multi-voltage threshold sampling on the target scintillation pulse on the basis of the plurality of sampling thresholds, so as to acquire second sampling data. The plurality of sampling thresholds can be determined based on empirical data and/or prior information about the scintillation pulse. The maximum sampling threshold among the plurality of sampling thresholds approaches the maximum amplitude of the scintillation pulse corresponding to the real single event. The intervals between the plurality of sampling thresholds can be equal. In other words, the plurality of sampling thresholds form an arithmetic sequence. The intervals between the plurality of sampling thresholds can be unequal. For example, the threshold interval increases with the number of sampling thresholds. The second sampling module 840 can perform sampling on one or more effective scintillation pulses using the same or similar method as the first sampling module 810.

The second determining module 850 can implement the above step 150 of determining, on the basis of the second sampling data, whether the target scintillation pulse corresponds to a real single event. The second determining module 850 can determine whether the target scintillation pulse corresponds to a real single event by determining whether the second sampling data indicates that the target scintillation pulse crosses the maximum sampling threshold. If the second sampling data includes the threshold-time pair corresponding to the target scintillation pulse crossing the maximum sampling threshold, the second determining module 850 can determine that the target scintillation pulse corresponds to a real single event. The second determining module 850 can also perform curve fitting on the target scintillation pulse based on the second sampling data to obtain the fitted pulse waveform of the target scintillation pulse. The second determining module 850 can obtain the energy value corresponding to the target scintillation pulse by integrating the fitted pulse waveform. By determining whether the energy value satisfies the preset condition, the second determining module 850 can determine whether the target pulse corresponds to a real single event.

The first information acquisition module 860 can implement the above step 160 of determining event information of the real single event based on the first sampling data and the second sampling data, when the target scintillation pulse corresponds to the real single event. The event information can include energy information. The energy information is used to indicate the energy value of the scintillation pulse corresponding to the real single event. Through the first information acquisition module 860, the energy value corresponding to the target scintillation pulse can, after being reduced, be designated as the energy information. The event information can further include time information. The time information can be used to indicate the moment when the real single event occurs. The first information acquisition module 860 can compare the minimum risetime among the first risetimes corresponding to one or more effective scintillation pulses so that the time information can be determined. The first information acquisition module 860 can further assign the first risetime corresponding to a maximum relative energy among the relative energies as the time information. The event information can further include positional information. The positional information can be used to indicate the position where the real single event occurs. The first information acquisition module 860 can assign a position identifier of a crystal channel, corresponding to an effective scintillation pulse related to the time information, as the positional information.

Figure 9:
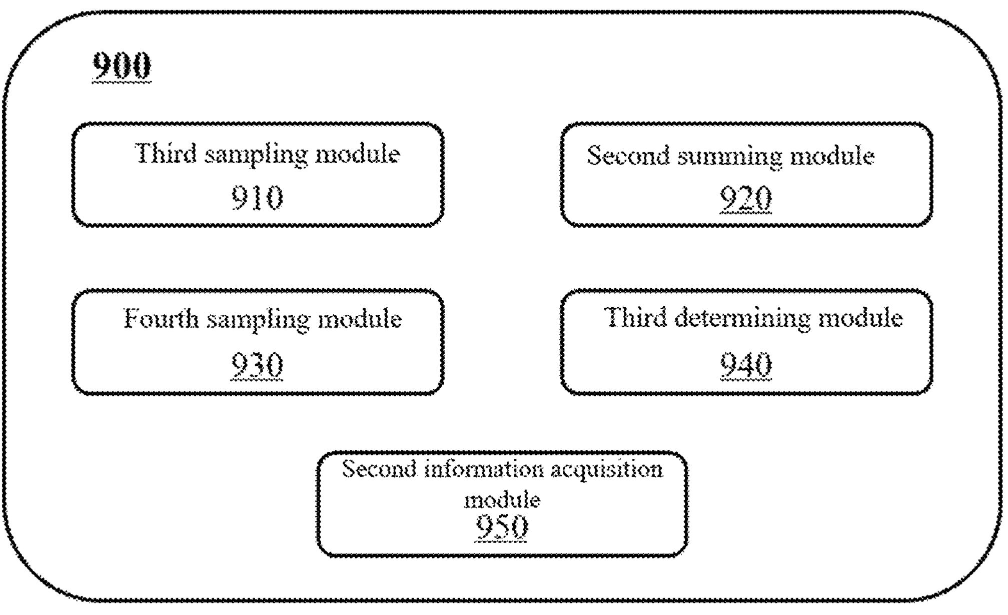
FIG. 9 is an exemplary block diagram of another data processing system for scintillation pulse processing according to some embodiments of the present disclosure.

FIG. 9 is an exemplary module diagram of another data processing system according to some embodiments of the present disclosure. The data processing system can achieve precise sampling of scintillation pulses. As shown in FIG. 9, the second data processing system 900 can include a third sampling module 910, a second summing module 920, a fourth sampling module 930, a third determining module 940, and a second information acquisition module 950.

The third sampling module 910 can implement the above step 610 of presetting two trigger thresholds, and respectively performing multi-voltage threshold sampling on at least two scintillation pulses on the basis of the two trigger thresholds, so as to acquire first sampling data.

The second summing module 920 can implement the above step 620 of superimposing the at least two scintillation pulses, so as to acquire a target scintillation pulse.

The fourth sampling module 930 can implement the above step 630 of presetting a plurality of sampling thresholds, and performing multi-voltage threshold sampling on the target scintillation pulse on the basis of the plurality of sampling thresholds, so as to acquire second sampling data.

The third determining module 940 can implement the above step 640 of determining, on the basis of the second sampling data, whether the target scintillation pulse corresponds to a real single event.

The second information acquisition module 950 can implement the above step 650 of determining target event information of the real single event based on the first sampling data and the second sampling data, when the target scintillation pulse corresponds to the real single event.

The second data processing system 900 can be the same system as the first data processing system 800. The first determining module 620 in the first data processing system 800 may not operate during the implementation of flow 600, with the remaining modules implementing the second data processing system 900.

Descriptions of the above modules can be referenced in the disclosed flowcharts and related sections of the present disclosure, such as FIGS. 1-7.

It should be understood that the systems and modules shown in FIGS. 8 and 9 can be implemented in various ways. For instance, in some embodiments, the systems and modules can be realized through hardware, software, or a combination of both. The hardware portion can be implemented using dedicated logic, and the software portion can be stored in memory and executed by a suitable instruction execution system, such as a microprocessor or dedicated hardware. Those skilled in the art can recognize that the disclosed methods and systems may be implemented using computer-executable instructions and/or processor control code contained in various types of storage media. These media include disks, CDs, DVD-ROMs, programmable memory such as read-only memory (firmware), or data carriers such as optical or electronic signal carriers. The system and its modules of the present specification can be implemented not only by hardware circuits such as very large-scale integrated circuits or gate arrays, semiconductors such as logic chips and transistors, or programmable hardware devices such as field-programmable gate arrays and programmable logic devices, but also by software executed by various types of processors, or by a combination of the above hardware circuits and software (for example, firmware).

It is essential to note that the descriptions above regarding the modules are for convenience and are not intended to limit the scope of the description. It can be understood that, for those skilled in the art, after understanding the principles of the system, various modules may be combined arbitrarily or form subsystems connected to other modules without departing from these principles. For example, the modules may share a storage module, or each module may have its own storage module. Such modifications are within the scope of protection of the present disclosure.

Figure 10:
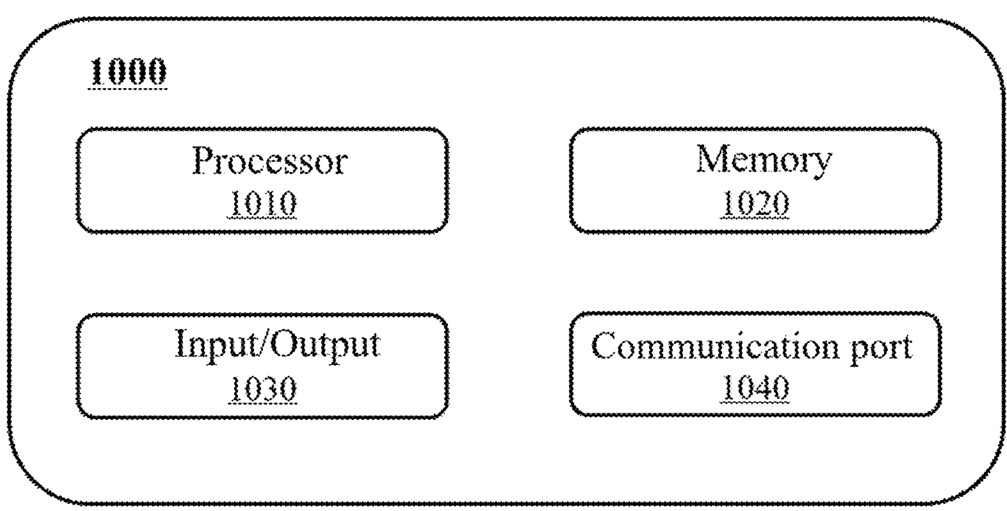
FIG. 10 is an exemplary functional block diagram of a data processing system for scintillation pulse processing according to some embodiments of the present disclosure.

FIG. 10 is an exemplary block diagram of processing equipment according to some embodiments of the present disclosure. The processing device 1000 can include any components used to implement the system described in the embodiments of the present disclosure. For example, the processing device 1000 can be implemented using hardware, software programs, firmware, or a combination thereof. For example, the processing device 1000 can implement the first data processing system 800 and the second data processing system 900. For convenience, only one processing device is shown in the figure, but the computational functions described in the embodiments of the present disclosure can be implemented in a distributed manner by a set of similar platforms to distribute the processing load of the system.

In some embodiments, the processing device 1000 can include a processor 1010, a memory 1020, input/output components 1030, and a communication port 1040. In some embodiments, the processor (e.g., CPU) 1010 can execute program instructions in the form of one or more processors. In some embodiments, the memory 1020 includes various types of program memory and data memory, such as hard disks, read-only memory (ROM), and random-access memory (RAM), which are configured for storing various data files processed and/or transmitted by the computer. In some embodiments, the input/output components 1030 can support input/output between the processing device 1000 and other components. In some embodiments, the communication port 1040 can be connected to a network to implement data communication. Exemplary processing devices can include program instructions executed by processor 1010 stored in read-only memory (ROM), random-access memory (RAM), and/or other types of non-transitory storage media. The methods and/or processes of the embodiments of the present disclosure can be implemented in the form of program instructions. The processing device 1000 can also receive the programs and data disclosed in the present disclosure through network communication.

For ease of understanding, only one processor is shown in FIG. 10. However, it should be noted that the processing device 1000 in the embodiments of the present disclosure can include multiple processors. Therefore, operations and/or methods described as being implemented by one processor can also be jointly or independently performed by multiple processors. For example, if the processor of the processing device 1000 executes step 1 and step 2 in the present disclosure, it should be understood that step 1 and step 2 can also be jointly or independently executed by two different processors of the processing device 1000 (for example, the first processor executes step 1, the second processor executes step 2, or both the first and second processors jointly execute step 1 and step 2).

The method for processing scintillation pulses provided by the present disclosure can specifically be applied in photon detection and can be used in various fields, such as medical imaging technology, high-energy physics, lidar, autonomous driving, precision analysis, optical communication, and other fields. In one specific example, the method and the apparatus for processing scintillation pulses, and the device and the storage medium provided by the present disclosure can be applied to positron emission tomography (PET). In a PET system, photon data can be acquired based on the embodiment of the present disclosure and then used for image reconstruction. In other specific examples of the present disclosure, the method and the apparatus for processing scintillation pulses, and the device and the storage medium provided by the present disclosure can be applied to various digital devices, such as CT equipment, MRI equipment, radiation detection equipment, oil detection equipment, low-light detection equipment, SPECT equipment, security inspection equipment, gamma cameras, X-ray equipment, and DR equipment, which utilize the principle of high-energy ray conversion; one of other photoelectric conversion application devices; or a combination of the above devices.

The basic concepts have been described herein, and clearly, for those skilled in the art, the detailed disclosure above serves only as an example and does not limit the present disclosure. Although not explicitly stated herein, those skilled in the art may make various modifications, improvements, and corrections to the present specification. These modifications, improvements, and corrections are suggested in the present specification, so these modifications, improvements, and corrections remain within the spirit and scope of the exemplary embodiments of the present disclosure.

Additionally, specific terms have been used in the present specification to describe the embodiments. For example, the terms "one embodiment," "an embodiment," and/or "some embodiments" mean a particular feature, structure, or characteristic related to at least one embodiment of the present specification. Therefore, it should be emphasized and understood that the "one embodiment", "an embodiment", or "an alternative embodiment" mentioned multiple times in different locations in the present specification does not necessarily refer to the same embodiment. Furthermore, certain features, structures, or characteristics of one or more embodiments of the present specification may be appropriately combined.

In addition, those skilled in the art will understand that various aspects of the present specification can be described and explained through several patentable types or situations, including any new and useful combinations of processes, machines, products, or substances, or any new and useful improvements thereof. Accordingly, various aspects of the present specification can be entirely executed by hardware, entirely executed by software (including firmware, resident software, microcode, etc.), or executed by a combination of hardware and software. The hardware or software mentioned above may be referred to as "data blocks", "modules", "engines", "units", "components", or "systems". Moreover, aspects of the present disclosure may be embodied as computer products located on one or more computer-readable media, and the products include computer-readable program code.

The computer storage medium can contain a propagated data signal that includes computer program code, for example, on a baseband or as part of a carrier. The propagation signal can take various forms, including electromagnetic form, optical form, or any suitable combination thereof. The computer storage medium can be any computer-readable medium other than a computer-readable storage medium, and the medium can be connected to an instruction execution system, device, or apparatus to implement communication, propagation, or transmission of the program for use. The program code located on the computer storage medium can be propagated through any suitable medium, including radio, cable, optical fiber cables, RF, or similar media, or any combination of the aforementioned media.

The computer program code required for the operation of each part of the present specification can be written in any one or more programming languages, including object-oriented programming languages such as Java, Scala, Smalltalk, Eiffel, JADE, Emerald, C++, C #, VB.NET, and Python; conventional procedural programming languages such as C language, Visual Basic, Fortran 3003, Perl, COBOL 3002, PHP, and ABAP; dynamic programming languages such as Python, Ruby, and Groovy; or other programming languages. The program code can run entirely on the computer of the user, or as an independent software package on the computer of the user, or partially run on the computer of the user and partially run on a remote computer, or run entirely on a remote computer or server. In the latter case, the remote computer can be connected to the computer of the user in any form of network, such as a local area network (LAN) or a wide area network (WAN), or connected to an external computer (e.g., through the Internet), or in a cloud computing environment, or used as a service such as Software as a Service (SaaS).

Additionally, unless specifically stated in the claims, the sequence of processing elements and sequences, the use of numerical or alphabetical characters, or the use of other names in the present disclosure are not intended to limit the order of processes and methods in the present specification. Although some useful embodiments of the present disclosure are discussed through various examples in the above disclosure, it should be understood that such details are for illustrative purposes only, and the appended claims are not limited to the disclosed embodiments. On the contrary, the claims are intended to cover all modifications and equivalent combinations that fall within the spirit and scope of the embodiments of the present disclosure. For example, although the system components described above can be implemented through hardware devices, they can also be implemented solely through software solutions, such as by installing the described system on existing servers or mobile devices.

Similarly, it should be noted that, in order to simplify the presentation of the disclosure in the present specification and to assist in understanding one or more embodiments of the present disclosure, multiple features may sometimes be merged into one embodiment, figure, or description of the embodiment. However, this disclosure method does not imply that the features required by the objects of the present specification are greater than the features mentioned in the claims. In fact, the features of the embodiment are fewer than the total features of the individual embodiment disclosed above.

In some embodiments, numbers describing the number of components or attributes are used, and it should be understood that such numbers used in the embodiment description are sometimes modified with words like "approximately", "about", or "substantially". Unless otherwise specified, "approximately", "about", or "substantially" indicates that the numbers described allow for a variation of ±20%. Accordingly, in some embodiments, the numerical parameters used in the specification and claims are approximations, and the approximation can change depending on the required characteristics of individual embodiments. In some embodiments, numerical parameters should take into account specified significant digits and be retained using general rounding methods. Although some embodiments of the present specification use approximate numerical ranges and parameters to confirm the breadth of their scope, and the numerical settings should be as precise as possible within the feasible range in specific embodiments.

For each patent, patent application, patent application publication, and other materials cited in the present specification, such as articles, books, manuals, publications, and documents, their entire content is incorporated into the present specification by reference. This does not include application history documents that are inconsistent or in conflict with the content of the present specification, nor does it include documents that limit the broadest scope of the claims in the present specification (whether currently or later appended to the present specification). It should be noted that if the descriptions, definitions, and/or use of terms in the appended materials of the present specification are inconsistent or conflict with the content described in the present specification, the descriptions, definitions, and/or terms used in the present specification shall prevail.

Finally, it should be understood that the embodiments described in the present specification are only used to illustrate the principles of the embodiments of the present specification. Other modifications may also fall within the scope of the present specification. Thus, as an example and not a limitation, alternative configurations of the embodiments of the present specification may be considered consistent with the teachings of the present specification. Accordingly, the embodiments of the present specification are not limited to the embodiments explicitly described and introduced in the present specification.

INDUSTRIAL PRACTICALITY

The present disclosure discloses a method and an apparatus for processing scintillation pulses, and a device and a storage medium. The method comprises: presetting two trigger thresholds, and respectively performing multi-voltage threshold sampling on at least two scintillation pulses on the basis of the two trigger thresholds, so as to acquire first sampling data; on the basis of the first sampling data, determining one or more effective scintillation pulses from among the at least two scintillation pulses; superimposing the effective scintillation pulses, so as to acquire a target scintillation pulse; presetting a plurality of sampling thresholds, and performing multi-voltage threshold sampling on the target scintillation pulse on the basis of the plurality of sampling thresholds, so as to acquire second sampling data; on the basis of the second sampling data, determining whether the target scintillation pulse corresponds to a real single event; and determining event information of the real single event based on the first sampling data and the second sampling data, when the target scintillation pulse corresponds to the real single event. In the present disclosure, time information and the energy amplitude of a real single event can be determined by means of a double-threshold duration, such that the reliability is high, and mis-sampling is avoided.

Additionally, it can be understood that the method and the apparatus for processing scintillation pulses, and the device and the storage medium of the present disclosure are reproducible and can be used in various industrial applications. For example, the method and the apparatus for processing scintillation pulses, and the device and the storage medium of the present disclosure can be used in the field of data processing.

The invention claimed is:

1. A method for processing scintillation pulses, wherein the method comprises:

presetting two trigger thresholds, and respectively performing multi-voltage threshold sampling on at least two scintillation pulses based on the two trigger thresholds, so as to acquire first sampling data;

determining, based on the first sampling data, one or more effective scintillation pulses from among the at least two scintillation pulses;

superimposing the one or more effective scintillation pulses, so as to acquire a target scintillation pulse;

presetting a plurality of sampling thresholds, and performing multi-voltage threshold sampling on the target scintillation pulse based on the plurality of sampling thresholds, so as to acquire second sampling data;

determining, based on the second sampling data, whether the target scintillation pulse corresponds to a real single event; and determining event information of the real single event based on the first sampling data and the second sampling data, when the target scintillation pulse corresponds to the real single event.

2. The method for processing scintillation pulses according to claim 1, wherein the step of determining, based on the first sampling data, one or more effective scintillation pulses from among the at least two scintillation pulses, comprises:

determining, for any of the scintillation pulses, whether the first sampling data comprises a higher trigger threshold of the two trigger thresholds, and designating the scintillation pulse as the effective scintillation pulses, when the first sampling data comprises the higher trigger threshold of the two trigger thresholds.

3. The method for processing scintillation pulses according to claim 1, wherein the step of superimposing the one or more effective scintillation pulses, so as to acquire a target scintillation pulse, comprises:

amplifying the effective scintillation pulses by one or more first amplifying circuits provided in parallel, respectively, so as to obtain one or more amplified scintillation pulses; and amplifying an input intermediate scintillation pulse summed by the one or more amplified scintillation pulses through a second amplifying circuit provided in series with the one or more first amplifying circuits provided in parallel, so as to obtain the target scintillation pulse.

4. The method for processing scintillation pulses according to claim 1, wherein the plurality of sampling thresholds are determined based on empirical data and/or a priori information about the scintillation pulses, and a maximum sampling threshold among the plurality of sampling thresholds closes to a maximum amplitude of scintillation pulses corresponding to the real single event.

5. The method for processing scintillation pulses according to claim 4, wherein the step of determining, based on the second sampling data, whether the target scintillation pulse corresponds to a real single event, comprises:

determining whether the second sampling data comprises the maximum sampling threshold, and determining, when the second sampling data comprises the maximum sampling threshold, that the target scintillation pulse corresponds to the real single event.

6. The method for processing scintillation pulses according to claim 1, wherein the step of determining, based on the second sampling data, whether the target scintillation pulse corresponds to a real single event, comprises:

performing pulse fitting of the target scintillation pulse based on the second sampling data, and determining a fitted pulse waveform;

determining an energy value corresponding to the target scintillation pulse based on the fitted pulse waveform;

determining whether the energy value meets a preset condition; and determining that the target scintillation pulse corresponds to the real single event, when the energy value meets the preset condition.

7. The method for processing scintillation pulses according to claim 6, wherein target time information comprises energy information, and a step of determining the energy information comprises:

determining the energy information based on the energy value, when the target scintillation pulse corresponds to the real single event.

8. The method for processing scintillation pulses according to claim 1, wherein for any of the effective scintillation pulses, the first sampling data comprises first risetime at which the effective scintillation pulse first crosses a lower trigger threshold and first fall time at which the lower trigger threshold is secondly crossed, and second risetime at which a higher trigger threshold is firstly crossed and second fall time at which the higher trigger threshold is secondly crossed.

9. The method for processing scintillation pulses according to claim 8, wherein the event information comprises time information, and a step of determining the time information comprises:

determining a minimum risetime in the first risetime corresponding to the one or more effective scintillation pulses, and assigning the minimum risetime as the time information.

10. The method for processing scintillation pulses according to claim 9, wherein the at least two scintillation pulses are generated by a crystal channel of a radiation detection device, the event information comprises positional information, and a step of determining the positional information comprises:

determining a position identifier of a crystal channel corresponding to an effective scintillation pulse corresponding to the time information, and assigning the position identifier as the positional information.

11. The method for processing scintillation pulses according to claim 8, wherein the event information comprises time information, and a step of determining the time information comprises:

determining a relative energy corresponding to each effective scintillation pulse, wherein the relative energy is a difference value between the second fall time and the first risetime; and assigning a first risetime corresponding to a maximum relative energy among the relative energies as the time information.

12. An apparatus for processing scintillation pulses, wherein the apparatus comprises a scintillation pulse processing circuit board, wherein the processing circuit board is configured to perform multi-voltage threshold sampling on the scintillation pulses and implement the method for processing scintillation pulses according to claim 1.

13. A processing device, comprising memory, a processor, and a computer program stored in the memory that can be executed on the processor, and when executing the computer program, the processor implements the steps of the processing method according to claim 1.

14. A method for processing scintillation pulses, wherein the method comprises:

presetting two trigger thresholds, and respectively performing multi-voltage threshold sampling on at least two scintillation pulses based on the two trigger thresholds, so as to acquire first sampling data;

superimposing the at least two scintillation pulses, so as to acquire a target scintillation pulse;

presetting a plurality of sampling thresholds, and performing multi-voltage threshold sampling on the target scintillation pulse based on the plurality of sampling thresholds, so as to acquire second sampling data;

determining, based on the second sampling data, whether the target scintillation pulse corresponds to a real single event; and determining event information of the real single event based on the first sampling data and the second sampling data, when the target scintillation pulse corresponds to the real single event.

15. An apparatus for processing scintillation pulses, wherein the apparatus comprises:

a first sampling module, configured for presetting two trigger thresholds, and respectively performing multi-voltage threshold sampling on at least two scintillation pulses based on the two trigger thresholds, so as to acquire first sampling data;

a first determining module, configured for determining, based on the first sampling data, one or more effective scintillation pulses from among the at least two scintillation pulses;

a first summing module, configured for superimposing the one or more effective scintillation pulses, so as to acquire a target scintillation pulse;

a second sampling module, configured for presetting a plurality of sampling thresholds, and performing multi-voltage threshold sampling on the target scintillation pulse based on the plurality of sampling thresholds, so as to acquire second sampling data;

a second determining module, configured for determining, based on the second sampling data, whether the target scintillation pulse corresponds to a real single event; and a first information acquisition module, configured for determining event information of the real single event based on the first sampling data and/or the second sampling data, when the target scintillation pulse corresponds to the real single event.

16. An apparatus for processing scintillation pulses, wherein the apparatus comprises:

a third sampling module, configured for presetting two trigger thresholds, and respectively performing multi-voltage threshold sampling on at least two scintillation pulses based on the two trigger thresholds, so as to acquire first sampling data;

a second summing module, configured for superimposing the at least two scintillation pulses, so as to acquire a target scintillation pulse;

a fourth sampling module, configured for presetting a plurality of sampling thresholds, and performing multi-voltage threshold sampling on the target scintillation pulse based on the plurality of sampling thresholds, so as to acquire second sampling data;

a third determining module, configured for determining, based on the second sampling data, whether the target scintillation pulse corresponds to a real single event; and a second information acquisition module, configured for determining, when the target scintillation pulse corresponds to the real single event, based on the first sampling data and/or the second sampling data, event information of the real single event.

17. The apparatus for processing scintillation pulses according to claim 16, wherein for superimposing the at least two scintillation pulses, so as to acquire a target scintillation pulse, the second summing module is configured for amplifying the at least two scintillation pulses by at least two first amplifying circuits provided in parallel, respectively, so as to obtain at least two amplified scintillation pulses; and amplifying an input intermediate scintillation pulse summed by the at least two amplified scintillation pulses through a second amplifying circuit provided in series with the at least two first amplifying circuits provided in parallel, so as to obtain the target scintillation pulse.

18. The apparatus for processing scintillation pulses according to claim 16, wherein the plurality of sampling thresholds are determined based on empirical data and/or a priori information about the scintillation pulses, and a maximum sampling threshold among the plurality of sampling thresholds closes to a maximum amplitude of scintillation pulses corresponding to the real single event.

19. The apparatus for processing scintillation pulses according to claim 18, wherein for determining, based on the second sampling data, whether the target scintillation pulse corresponds to a real single event, the third determining module is configured for determining whether the second sampling data comprises the maximum sampling threshold, and determining, when the second sampling data comprises the maximum sampling threshold, that the target scintillation pulse corresponds to the real single event.

20. The apparatus for processing scintillation pulses according to claim 16, wherein for determining, based on the second sampling data, whether the target scintillation pulse corresponds to a real single event, the third determining module is configured for performing pulse fitting of the target scintillation pulse based on the second sampling data, and determining a fitted pulse waveform;

determining an energy value corresponding to the target scintillation pulse based on the fitted pulse waveform;

determining whether the energy value meets a preset condition; and determining, when the energy value meets the preset condition, that the target scintillation pulse corresponds to the real single event.

21. The apparatus for processing scintillation pulses according to claim 20, wherein target time information comprises energy information; and for determining the energy information, the second information acquisition module is configured for determining, when the target scintillation pulse corresponds to the real single event, the energy information based on the energy value.

22. The apparatus for processing scintillation pulses according to claim 16, wherein the first sampling data indicates that a scintillation pulse crossing a higher trigger threshold is the effective scintillation pulse; and for any of the effective scintillation pulses, the first sampling data comprises first risetime at which the effective scintillation pulse first crosses a lower trigger threshold and first fall time at which the lower trigger threshold is secondly crossed, and second risetime at which the higher trigger threshold is firstly crossed and second fall time at which the higher trigger threshold is secondly crossed.

23. The apparatus for processing scintillation pulses according to claim 22, wherein the event information comprises time information, and for determining the time information, the second information acquisition module is configured for determining a minimum risetime in the first risetime corresponding to the one or more effective scintillation pulses, and assigning the minimum risetime as the time information.

24. The apparatus for processing scintillation pulses according to claim 23, wherein the at least two scintillation pulses are generated by a crystal channel of a radiation detection device, the event information comprises positional information, and for determining the positional information, the second information acquisition module is configured for determining a position identifier of a crystal channel corresponding to an effective scintillation pulse corresponding to the time information, and assigning the position identifier as the positional information.

25. The apparatus for processing scintillation pulses according to claim 22, wherein the event information comprises time information, and for determining the time information, the second information acquisition module is configured for determining a relative energy corresponding to each effective scintillation pulse, wherein the relative energy is a difference value between the second fall time and the first risetime; and assigning a first risetime corresponding to a maximum relative energy among the relative energies as the time information.

* * * * *